US010025102B2

(12) United States Patent
Memmott et al.

(10) Patent No.: US 10,025,102 B2
(45) Date of Patent: *Jul. 17, 2018

(54) MAPPING INPUT TO HOLOGRAM OR TWO-DIMENSIONAL DISPLAY

(71) Applicant: Microsoft Technology Licensing, LLC, Redmond, WA (US)

(72) Inventors: Robert Courtney Memmott, Woodinville, WA (US); Jonathan R. Christen, Bothell, WA (US); Benjamin John Sugden, Redmond, WA (US); Marcus Tanner, Redmond, WA (US); Jonathan Paton Gallina, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,399

(22) Filed: Aug. 21, 2017

(65) Prior Publication Data
US 2017/0351097 A1 Dec. 7, 2017

Related U.S. Application Data

(63) Continuation of application No. 14/830,117, filed on Aug. 19, 2015, now Pat. No. 9,740,011.

(51) Int. Cl.
G02B 27/01 (2006.01)
G06F 1/16 (2006.01)
(Continued)

(52) U.S. Cl.
CPC ......... G02B 27/0172 (2013.01); G06F 1/163 (2013.01); G06F 3/011 (2013.01);
(Continued)

(58) Field of Classification Search
CPC .......... G02B 27/0172; G02B 2027/014; G06F 3/013; G06F 3/04842
See application file for complete search history.

(56) References Cited

U.S. PATENT DOCUMENTS 7,750,911 B2   7/2010  Bae
7,843,470 B2   11/2010 Bannai et al.
(Continued)

OTHER PUBLICATIONS

"On the Road for VR: Microsoft Hololens at Build 2015", Retrieved from «http://doc-ok.org/?p=1223», May 1, 2015, 11 Pages.
(Continued)

*Primary Examiner* — Nam Pham
(74) *Attorney, Agent, or Firm* — Alleman Hall Creasman & Tuttle LLP

(57) ABSTRACT

Various embodiments relating to editing holograms by extending real world interfaces are disclosed. One embodiment includes a computing device configured to communicatively couple to a head mounted display device having an at least partially see-through display. The computing device includes a non-see-through display, a user input device, and a processor configured to determine whether a user focus is on an image or a hologram, if a determination is made that the user focus is on the image, map the user input to a first coordinate space of the non-see-through display, and if a determination is made that the user focus is the on the hologram, map the user input to a second coordinate space of the head mounted display device.

20 Claims, 9 Drawing Sheets

(51) Int. Cl.
*G06F 3/01* (2006.01)
*G06F 3/038* (2013.01)
*G06F 3/0346* (2013.01)
*G06F 3/0481* (2013.01)
*G06F 3/0484* (2013.01)

(52) U.S. Cl.
CPC .............. *G06F 3/012* (2013.01); *G06F 3/013* (2013.01); *G06F 3/038* (2013.01); *G06F 3/0346* (2013.01); *G06F 3/04812* (2013.01); *G06F 3/04815* (2013.01); *G06F 3/04842* (2013.01); *G06F 3/04845* (2013.01); *G02B 2027/014* (2013.01); *G02B 2027/0174* (2013.01)

(56) References Cited

U.S. PATENT DOCUMENTS

| | | | |
|---|---|---|---|
| 8,754,931 | B2 | 6/2014 | Gassel et al. |
| 2010/0208033 | A1 | 8/2010 | Edge et al. |
| 2012/0113223 | A1 | 5/2012 | Hilliges et al. |
| 2013/0083173 | A1 | 4/2013 | Geisner et al. |
| 2013/0120378 | A1 | 5/2013 | Miller et al. |
| 2013/0141360 | A1 | 6/2013 | Compton et al. |
| 2013/0162637 | A1 | 6/2013 | Son |
| 2013/0169594 | A1 | 7/2013 | Yi et al. |
| 2013/0335405 | A1* | 12/2013 | Scavezze ................ G06T 19/20 345/419 |
| 2014/0053086 | A1 | 2/2014 | Kim et al. |
| 2014/0176607 | A1 | 6/2014 | Yang et al. |
| 2014/0313555 | A1 | 10/2014 | Oh et al. |

OTHER PUBLICATIONS

"Notice of Allowance Issued in U.S Appl. No. 14/830,117", dated Apr. 27, 2017, 8 Pages.

Chow, Yang-Wai, "3D Spatial Interaction with the Wii Remote for Head-Mounted Display Virtual Reality", In Proceedings of World Academy of Science, Engineering and Technology, vol. 50, Feb. 2009, pp. 377-383.

Grossman, et al., "Multi-Finger Gestural Interaction with 3D Volumetric Displays", In Proceedings of the 17th Annual ACM Symposium on User Interface Software and Technology, Oct. 24, 2004, 10 Pages.

Krichenbauer, et al., "Towards Augmented Reality User Interfaces in 3D Media Production", In Proceedings of IEEE International Symposium on Mixed and Augmented Reality, Sep. 10, 2014, 6 Pages.

* cited by examiner

MAPPING INPUT TO HOLOGRAM OR TWO-DIMENSIONAL DISPLAY

CROSS REFERENCE TO RELATED APPLICATIONS

This application is a continuation of U.S. patent application Ser. No. 14/830,117, filed Aug. 19, 2015, the entire contents of which is hereby incorporated herein by reference for all purposes.

BACKGROUND

Augmented reality systems display holograms to a user on a see-through display which may be incorporated into a head mounted device such as glasses or other types of eyewear, for example, and which enables the user to view and interact both with holograms displayed via the head mounted device and with real world objects in the surrounding physical environment. In one application, the holographic display capabilities of such systems may be used to display complex three dimensional data sets as holograms, enabling users to quickly and intuitively inspect and interact with the data sets using augmented reality input methods, such as hand gestures. However, it will be appreciated that some types of interaction with these data sets may be more efficiently performed via an input device such as a keyboard and/or mouse, and that some types of work may be more efficiently performed with such input devices on a desktop or laptop computer having two dimensional, flat panel display.

SUMMARY

To address these issues, a computing system and method are provided for mapping input to a three dimensional holographic interface or a two dimensional display. The computing system may comprise a computing device configured to communicatively couple to a head mounted display device having an at least partially see-through display configured to display holograms to a user in a three dimensional environment, the computing device including a non-see-through display arranged in the three dimensional environment, a user input device, and a processor configured to: display an image on the non-see-through display, send to the head mounted display device, for display on the at least partially see-through display, a hologram at a location in the three dimensional environment, receive, via the user input device, a user input, determine whether a user focus is on the image or the hologram, if a determination is made that the user focus is on the image, map the user input to a first coordinate space of the non-see-through display, and if a determination is made that the user focus is the on the hologram, map the user input to a second coordinate space of the head mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure addresses the challenges of enabling a user to concurrently interact with both an augmented reality system in which three dimensional holograms are displayed, and with a desktop or laptop computer which includes a flat panel two dimensional display and an input device such as a keyboard and mouse. More particularly, the present disclosure relates to affording users the ability to use the same user input device to edit both the three dimensional holograms displayed via a head mounted display device of the augmented reality system and two dimensional images displayed via the flat panel screen of the desktop or laptop computing device. For example, a user may be familiar and comfortable with the use of a computer mouse. When the user switches from interacting with a desktop or laptop computing device with a mouse while viewing a two dimensional display through a see through display of a head mounted display device, to viewing holograms displayed on the see-through display of the head mounted display device, it may be more natural for the user to continue using the computer mouse rather than switching to a different input method such as hand gestures.

In one specific example, such a system may be used to view a data set of a computer aided design program representing a building, machine, etc., as a hologram that can be viewed from all angles and expanded or reduced in size as needed to gain understanding of the object. In this way, a designer may quickly and intuitively ascertain the impact of a design, and may make changes to the design in either the holographic environment or the two dimensional environment of the desktop display, for example, by using a mouse input that is then mapped to the coordinate space of the holographic environment or the two dimensional environment of the desktop display, affording the user the benefits of both environments.

Systems and methods are provided herein for mapping the input from the user input device to the two dimensional user interface displayed on the flat panel display of the desktop or laptop computer under some circumstances, and to the three dimensional holographic user interface displayed by the head mounted display device, under other circumstances, as described in detail below.

Figure 1:
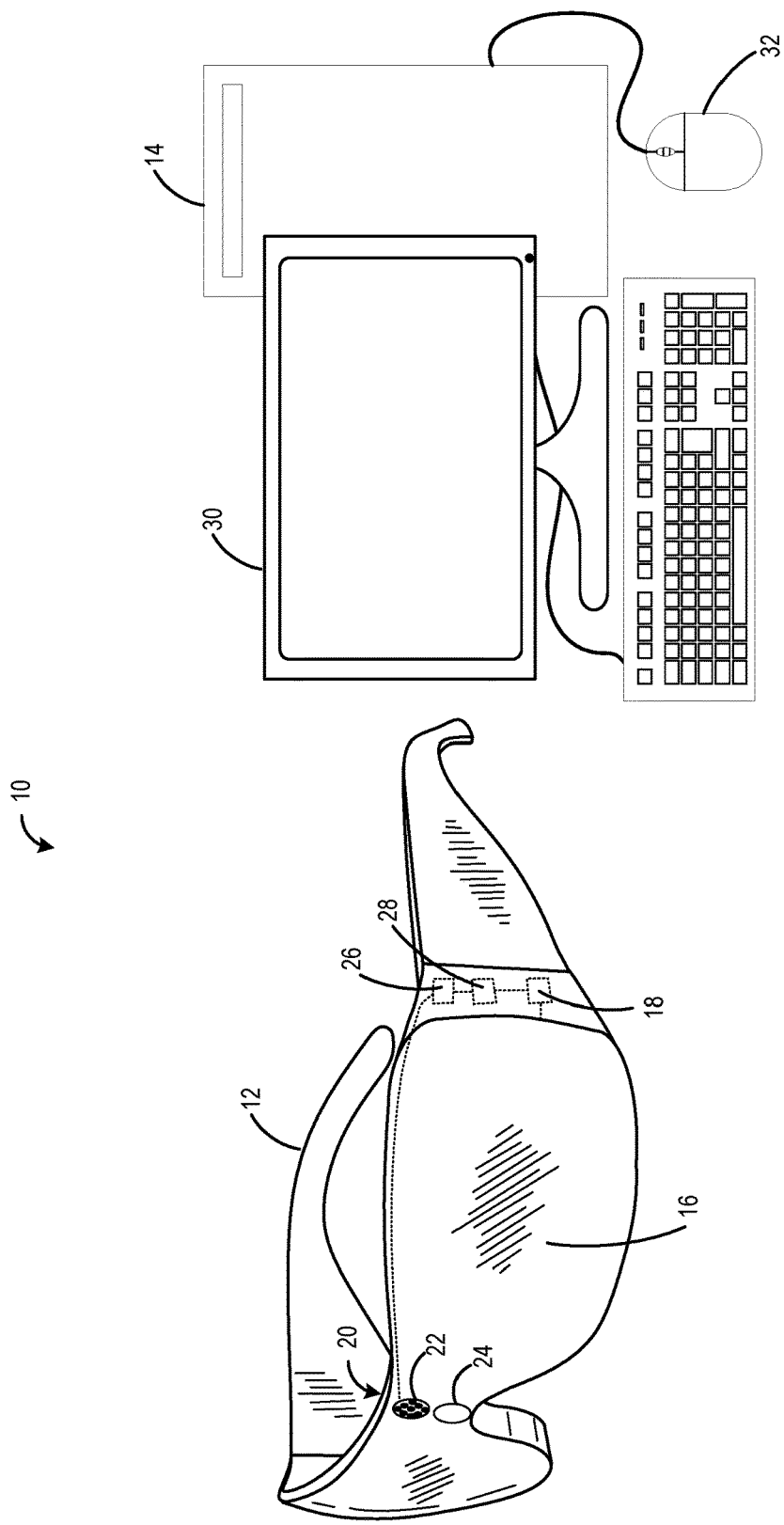
FIG. 1 shows an example computing system according to an embodiment of the present description.

FIG. 1 illustrates an example computing system 10 that includes a head mounted display (HMD) device 12 and a computing device 14. The illustrated HMD device 12 takes the form of wearable glasses or goggles, but it will be appreciated that other forms are possible. The HMD device 12 includes an at least partially see-through stereoscopic display 16 that may be configured to visually augment an appearance of a physical environment being viewed by the user through the at least partially see-through stereoscopic display. In some examples, the at least partially see-through stereoscopic display 16 may include one or more regions that are transparent (e.g., optically clear) and may include one or more regions that are opaque or semi-transparent. In other examples, the at least partially see-through stereoscopic display 16 may be transparent (e.g., optically clear) across an entire usable display surface of the stereoscopic display 16.

For example, the HMD device 12 may include an image production system 18 that is configured to display virtual objects to the user with the at least partially see-through stereoscopic display 16, which are visually superimposed onto the physical environment so as to be perceived at various depths and locations. The HMD device 16 may use stereoscopy to visually place a virtual object at a desired depth by displaying separate images of the virtual object to both of the user's eyes. To achieve the perception of depth, the image production system 18 of the HMD device 12 may render two images of the virtual object at a rendering focal plane of the HMD device 12, such that there is a binocular disparity between the relative positions of the virtual object in the two images. For example, this binocular disparity may be a horizontal disparity where the relative positions of the virtual object in the two images are separated by a distance in the horizontal direction.

The horizontal disparity between the relative positions of the virtual object in the two images will cause the user to perceive that the virtual object is located at a certain depth within the viewed physical environment due to stereopsis. Using this stereoscopy technique, the HMD device 12 may control the displayed images of the virtual objects, such that the user will perceive that the virtual objects exist at a desired depth and location in the viewed physical environment.

The HMD device 12 includes an optical sensor system 20 that may include one or more optical sensors. In one example, the optical sensor system 20 includes an outward facing optical sensor 22 that may be configured to detect the real-world background from a similar vantage point (e.g., line of sight) as observed by the user through the at least partially see-through stereoscopic display 16. The optical sensor system 20 may include a variety of additional sensors, such as an inward facing optical sensor 24 that may be configured to detect a gaze direction of the user, a depth camera, and an RGB camera, which may be a high definition camera or have another resolution.

The HMD device 12 may further include a position sensor system 26 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 20 and/or position sensor information received from position sensor system 26 may be used to assess a position and orientation of the vantage point of the at least partially see-through stereoscopic display 16 relative to other environmental objects. In some embodiments, the position and orientation of the vantage point may be characterized with six degrees of freedom (e.g., world-space X, Y, Z, pitch, roll, yaw). The vantage point, or gaze direction of the user, may be characterized globally or independent of the real-world background. The position and/or orientation may be determined with an on-board computing system (e.g., on-board computing system 28) and/or an off-board computing system, such as computing device 14.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background, including objects arranged in the real-world such as computing device 14. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world. In particular, the optical sensor information and the position sensor information may be used to determine a location and gaze direction of a user in relation to both a virtual object having a virtual location in the real-world, as well as a computing device 14 that may be arranged in the same real-world environment.

The computing device 14 includes a non-see-through display 30. The illustrated non-see-through display 30 takes the form of a flat screen display, but it will be appreciated that other forms are possible. For example, the non-see-through display 30 may be a cathode ray tube (CRT) monitor, a non-flat screen display (e.g., a curved display), or a display integrated with the computing device 14 as a few non-limiting examples. The non-see-through display 30 is configured to display images rendered by computing device 14. It will be appreciated that the non-see through display is two dimensional, i.e., it is configured to display a two dimensional array of pixels. This is in contrast to the three dimensional holographic interface displayed by the HMD device, which is three dimensional, as it is configured to display a three dimensional array of voxels to form a three dimensional hologram.

The computing device 14 may further include a user input device 32. The illustrated user input device 32 takes the form of a computer mouse, but it will be appreciated that other forms are possible. For example, the user input device 32 may be a trackball mouse, a touchpad, or a joystick as a few non-limiting examples.

The computing device 14 may be configured to communicatively couple to the HMD device 12. As non-limiting examples, the computing device 14 may be configured for communication with HMD device 12 via a wireless telephone network, a wired or wireless local- or wide-area network, or a directly coupled wired connection from computing device 14 to HMD device 12.

Figure 2:
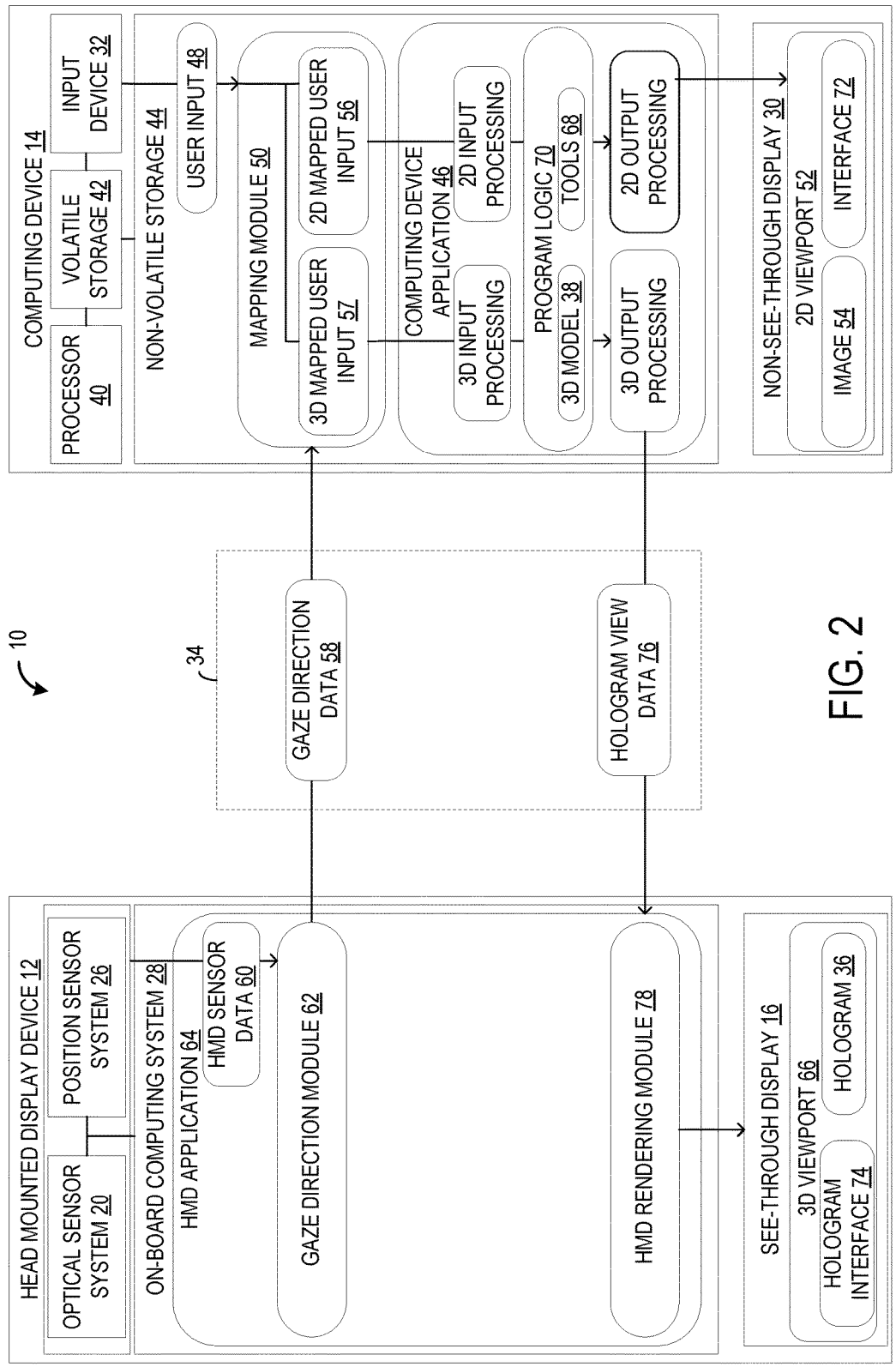
FIG. 2 shows a schematic view of the computing system of FIG. 1.

FIG. 2 schematically illustrates the example computing system 10. As described above, computing system 10 may include a computing device 14 configured to communicatively couple to a head mounted display device 12 over a network 34, the head mounted display device having an at least partially see-through display 16 configured to display holograms 36 to a user in a three dimensional environment. The computing device 14 includes a non-see-through display 30 arranged in the three dimensional environment, the non-see-through display 30 being configured to display images 54. In one embodiment, the image 54 is a two-dimensional visual representation of a data set and the hologram 36 is a three dimensional holographic representation of the data set. In one specific example, the data set is a three dimensional model 38 that represents a three dimensional virtual object. Accordingly, the image may be a two dimensional view of the three dimensional model from a particular viewpoint, and the hologram may be a three dimensional view of the three dimensional model from a vantage point of the head mounted display device relative to a virtual location of the three dimensional model in the three dimensional environment. Thus, any changes to the underlying data set may affect both the image and the hologram displayed to the user.

The computing device 14 further includes a user input device 32, a processor 40, a volatile storage device 42, and a non-volatile storage device 44. The processor 40 of computing device 14 may be configured to execute a computing device application 46 and a mapping module 50 stored on the non-volatile storage device 44. The computing device 14 is configured to receive, via the user input device 32, a user input 48. As discussed above, it will be appreciated that the user input device 32 may take the form of a computer mouse, a trackball mouse, a touchpad, a keyboard, or a joystick as a few non-limiting examples.

The user input 48 received via the user input device 32 is sent to the mapping module 50 executed by processor 40. Mapping module 50 is configured to either map the user input 48 to a first coordinate space of the non-see-through display 30 or map the user input 48 to a second coordinate space of the head mounted display device 12. In one embodiment, the first coordinate space may correspond to a two dimensional viewport 52 presented via the non-see-though display 30. The two dimensional viewport 52 may be a viewport of the computing device application 46 to which rendered content is applied at a resolution suitable for the non-see-through display 30, the two dimensional viewport 52 being presented to the user via the non-see-through display 30. For example, the first coordinate space may be defined by the two dimensional plane of the two dimensional viewport, including an x and y axis. Additionally, in this embodiment, the second coordinate space may correspond to the three dimensional environment. For example, the head mounted display device 12 may be configured to define a three dimensional viewport 66, which may be a three dimensional viewing volume that includes an x, y, and z axis, such that the at least partially see-through display 16 may be configured to display holograms 36 at locations within the three dimensional viewing volume. The three dimensional viewing volume may be a cube or rectangular shape that is a subspace of the three dimensional environment, although it will be appreciated that other three dimensional shapes are possible.

The mapping module 50 may be configured to determine whether to map the user input 48 to the first coordinate space or the second coordinate space. In one embodiment, to make the above determination, the mapping module 50 may be configured to determine whether a user focus is on the image 54 or the hologram 36. If a determination is made that the user focus is on the image 54, the mapping module 50 may be configured to map the user input 48 to the first coordinate space to generate two dimensional mapped user input 56. However, if a determination is made that the user focus is the on the hologram 36, the mapping module 50 may be configured to map the user input 48 to the second coordinate space to generate three dimensional mapped user input 57.

The mapping module 50 may determine whether the user focus is on the image or on the hologram using a variety of methods. In one embodiment, to determine whether the user focus is on the image or on the hologram, the mapping module 50 may be configured to determine a gaze direction of the user of the head mounted display device 12 based on gaze direction data 58 received from the head mounted display device 12. The mapping module 50 is further configured to determine whether the gaze direction of the user is towards the non-see-through display 30 or towards the location of the hologram 36 in the three dimensional environment. Based on the determination that the gaze direction of the user is towards the non-see-through display 30, the mapping module 50 may be configured to determine that the user focus is on the image. On the other hand, based on the determination that the gaze direction of the user is towards the location of the hologram 36, the mapping module 50 may be configured to determine that the user focus is on the hologram 36.

To generate the gaze direction data 58, the head mounted display device 12 may be configured to process HMD sensor data 60 received at a gaze direction module 62 of an HMD application 64 executed by the on-board computing system 28 of the head mounted display device 12. The HMD sensor data 60 includes optical sensor information received via the optical sensor system 20 and the position sensor information received via the position sensor system 26. As discussed above, the optical sensor information and position sensor information may be used to perform analysis of the real-world background to create a virtual model of the real-world background, including objects arranged in the real-world such as the non-see-through display 30 of computing device 14. In particular, the gaze direction module 62 may be configured to recognize the non-see-through display 30 of computing device 14 based on the optical sensor information received via the outward facing optical sensor 22 of the optical sensor system 20. Thus, the position and orientation of the head mounted display device 12, including a user gaze direction, may be characterized relative to the virtual model or objects arranged in the real-world such as the non-see-through display 30. For example, the head mounted display device 12 may define a three dimensional coordinate space that may be used to determine positions and orientations of virtual objects such as hologram 36, as well as real-world objects such as the non-see-through display 30, relative to the head mounted display device 12. Accordingly, gaze direction module 62 may be configured to process HMD sensor data 60, and generate gaze direction data 58 that indicates whether the gaze direction of the user of the head mounted display device 12 is towards the non-see-through display 30 or towards the hologram 36.

As discussed above, after receiving gaze direction data 58, the mapping module 50 is configured to map the user input 48 to either the first coordinate space of the non-see-through display 30 or to the second coordinate space of the head mounted display device 12. In one specific example, the user input device 32 is a computer mouse and the mapping module receives two dimensional user input corresponding to the computer mouse moving along a plane, such as a mouse pad on a desk. This two dimensional user input may be processed as a two dimensional vector input for example. Additionally, the first coordinate space may be defined by the plane of the two dimensional viewport 52 presented via the non-see-through display 30. Thus, in this example, the user input 48 may be mapped to the first coordinate space by directly mapping the two dimensional input, such as a two dimensional vector input, to the x and y axis of the first coordinate space. It will be appreciated that the two dimensional vector input of the user input 48 may be scaled by a scalar value when mapped to the first coordinate space to achieve a suitable sensitivity. Non-linear scaling may also be applied, if desired.

In the above example, to map the user input 48 to the second coordinate space, the mapping module 50 may be configured to determine a gaze direction of the user of the head mounted display device based on the received gaze direction data 58, and further configured to determine a plane that is orthogonal to the gaze direction of the user and is a set distance away from the user, and map the user input to the plane. Thus, in this example where the user input device 32 is a computer mouse, and the user input 48 is a two dimensional vector input, the user input 48 may be mapped to the plane in the same manner that the user input 48 is mapped to the first coordinate space. As the user changes gaze direction, the location and orientation of the plane orthogonal to the gaze direction will also change. Accordingly, the combination of the user's gaze direction and the two dimensional vector input of the computer mouse input device are combined to generate three dimensional mapped user input 57. It will be appreciated that the set distance may be any suitable distance from the head mounted display device 12 worn by the user. In one specific example, the set distance may be a variable distance that may be set based on additional user input, such as input from a scroll wheel of the mouse. In another example, the computing device 14 may determine the set distance by first determining an intersection between the user's gaze direction and the hologram 36. The computing device 14 may determine the set distance such that the plane is located at the intersection between the user's gaze direction and the hologram 36.

The mapping module 50 may be further configured to control a virtual cursor displayed on the non-see-through display 30 based on the two dimensional mapped user input 56 and a hologram cursor displayed on the at least partially see-through display 16 based on the three dimensional mapped user input 57. In one embodiment, if the determination is made that the user focus is on the image, the computing device 14 may be configured to display a virtual cursor at a two dimensional position in the first coordinate space corresponding to a viewport presented via the non-see-through display. In one specific example, the two dimensional position is an x-y position in the plane of the viewport. It will be appreciated that the virtual cursor may take any suitable form, such as an arrow, a virtual hand, or a pointer as a few non-limiting examples.

Next, the mapping module 50 may be configured to update the two dimensional position of the virtual cursor based on the mapped user input. In one specific example, the user input device is a computer mouse that outputs a two dimensional vector corresponding to movement of the computer mouse on a mousepad. The mapping module 50 maps the two dimensional vector input as a two dimensional vector translation of the two dimensional position of the virtual cursor.

After updating the two dimensional position of the virtual cursor, the mapping module 50 may be further configured to determine whether the updated two dimensional position of the virtual cursor is outside the viewport. In one specific example, the two dimensional viewport 30 defines a first coordinate space that includes a portion of an x-y plane corresponding to a particular resolution. If the two dimensional position of the virtual cursor is updated to be outside of the portion of the x-y plane, then the mapping module 50 determines that the virtual cursor is outside the viewport. In one embodiment, the virtual cursor may be determined to be outside the viewport if a portion of the virtual cursor is outside of the viewport. In another embodiment, the virtual cursor is determined to be outside the viewport when the entire virtual cursor is determined to be outside the viewport. Next, if the determination is made that the updated two dimensional position of the virtual cursor is outside the viewport, the mapping module 50 is configured to determine that the user focus is on the hologram.

On the other hand, if the determination is made that the user focus is the on the hologram, the mapping module 50 may be configured to display the virtual cursor as a hologram cursor at a three dimensional position in the second coordinate space corresponding to the three dimensional environment. In one specific example, the second coordinate space is a three dimensional coordinate space corresponding to a viewing volume defined by the head mounted display device 12 that is a subspace of the three dimensional environment. In this example, the hologram is displayed so as to appear to be at a particular location in the viewing volume. The three dimensional position may include an x, y, and z coordinate. It will be appreciated that the hologram cursor may take a variety of forms such as a three dimensional arrow, a three dimensional virtual hand, or a three dimensional pointer as a few non-limiting examples.

Next, the mapping module 50 may be further configured to update the three dimensional position of the hologram cursor based on the mapped user input. In the example where the user input device is a mouse that outputs a two dimensional vector, the three dimensional position of the hologram cursor may be updated by translating the three dimensional position by the two dimensional vector along a plane orthogonal to the gaze direction of the user. After updating the three dimensional position of the hologram cursor, the mapping module 50 may be further configured to determine whether the updated three dimensional position of the hologram cursor overlaps the non-see-through display arranged in the three dimensional environment. As discussed above, the head mounted display device 12 may detect and recognize the non-see-through display based on the HMD sensor data 60 received from the optical sensor system 20 and position sensor system 26. Accordingly, the position of the non-see-through display in the viewing volume may be determined by the head mounted display device 12, and sent to the computing device 14 as a part of the gaze direction data 58. Thus, the mapping module 50 may be configured to determine whether the hologram cursor overlaps the non-see-through display from the perspective of the user based on the positions of the non-see-through display and the hologram cursor in the viewing volume. It will be appreciated that the mapping module 50 may be configured to determine that the hologram cursor overlaps the non-see-through display if either a portion of the hologram cursor or the entire hologram cursor overlaps the non-see-through display. Next, if the determination is made that the updated three dimensional position of the hologram cursor overlaps the non-see-through display, the mapping module 50 is further configured to determine that the user focus is on the image.

The mapping module 50 may be configured to send the 3D mapped user input 57 to 3D input processing of the computing device application 46, and the 2D mapped user input 56 to 2D input processing of the computing device application 46. The computing device application 46 may be configured to apply the 3D mapped user input 57 and the 2D mapped user input 56 with tools 68 of the computing device application 46 to transform, select, or otherwise effect a data set, which may be 3D model 38 of computing device application 46 in one example.

The computing device 14 may be configured to display, on the non-see-through display 30, an interface 72 that includes selectable tools, each tool being associated with a programmatic function. The tools and associated programmatic functions may be stored in programming logic 70 of the computing device application 46 executed on the computing device 12. It will be appreciated that a variety of tools and programmatic functions may be stored in programming logic 70, such as a resizing function, a move function, a select function, a rotate function, or a tumble function as a few non-limiting examples. The computing 14 device may be further configured to send to the head mounted display device, for display on the at least partially see-through display 16, a hologram interface 74 that includes selectable hologram tools, each hologram tool being associated with a hologram programmatic function.

Similarly, the hologram tools and associated hologram programmatic functions may be stored in programming logic 70. It will be appreciated that the hologram tools of the hologram interface directly correspond to the tools of the interface. For example, both the interface 72 and the hologram interface 74 may include tools and associated programmatic functions for moving or selecting the data set. In one embodiment, the interface 72 includes a first tool having a first programmatic function, and the hologram interface 74 includes a corresponding first hologram tool having a first hologram programmatic function that corresponds to the first programmatic function. In one specific example, the first programmatic function is a two dimensional programmatic function and the first hologram programmatic function is a three dimensional version of the same programmatic function (e.g two dimensional resizing and three dimensional resizing).

Next, if the determination is made that the user focus is on the image, the computing device application 46 may be further configured to execute the programmatic function of a selected tool on the data set based on the mapped user input and update both the image and the hologram based on the programmatic function executed on the data set.

On the other hand, if the determination is made that the user focus is the on the hologram, the computing device application 46 may be further configured to execute the hologram programmatic function of a selected hologram tool on the data set based on the mapped user input, and update both the image and the hologram based on the hologram programmatic function executed on the data set. It will be appreciated that the tool or hologram tool being executed may be selected through a variety of methods. In one example, the tool or hologram tool is selected by the user via a user selection input. The user selection input may be a dimensional-less input received via the user input device. In one specific example, the user selection input may be a mouse click on the selected tool of the interface or hologram interface. It will be appreciated that other user selection inputs are possible, such as a voice command, and touch input, or a keyboard input as a few non-limiting examples.

Thus, the computing device application 46 may transform, select, or otherwise affect the data set, which may be the 3D model 38 for example. The computing device application 46 may then send the data set and visual data for the interface 72 and hologram interface 74 to the 2D output processing and 3D output processing. At 2D output processing, the computing device application 46 may render the image 54, which is a two dimensional view of the data set, as well as the graphical user interface for the interface 72 to a 2D viewport 52. The computing device application 46 may then send the 2D viewport 52 for display on the non-see-through display 30.

At 3D output processing, the computing device application 46 may render the hologram 36, which is a three dimensional view of the data set, as well as the holographic user interface for the hologram interface 74 to a 3D viewport 66. In one example, the 3D viewport is a viewing volume defined by the head mounted display device 12. Thus, the hologram 36 and the hologram interface 74 are rendered as having three dimensional positions in the viewing volume. The computing device application 46 may then send the rendered 3D viewport 66 to the head mounted display device 12 over the network 34 as hologram view data 76 for display on the at least partially see through display 16. In one embodiment, the computing device 46 operates in conjunction with an HMD rendering module 76 to render the three dimensional content. It will be appreciated that the hologram 36 itself may be either three dimensional or two dimensional. In one example, the hologram 36 is a two dimensional planar object that is displayed as having a three dimensional position in the viewing volume. In this example, while the visual of the hologram 36 itself is two dimensional, the hologram 36 has a three dimensional location and orientation within the viewing volume. The three dimensional location and orientation of the two dimensional hologram 36 may be included in the data set, and may be modified by the hologram tools according to the embodiments discussed above.

Figure 3:
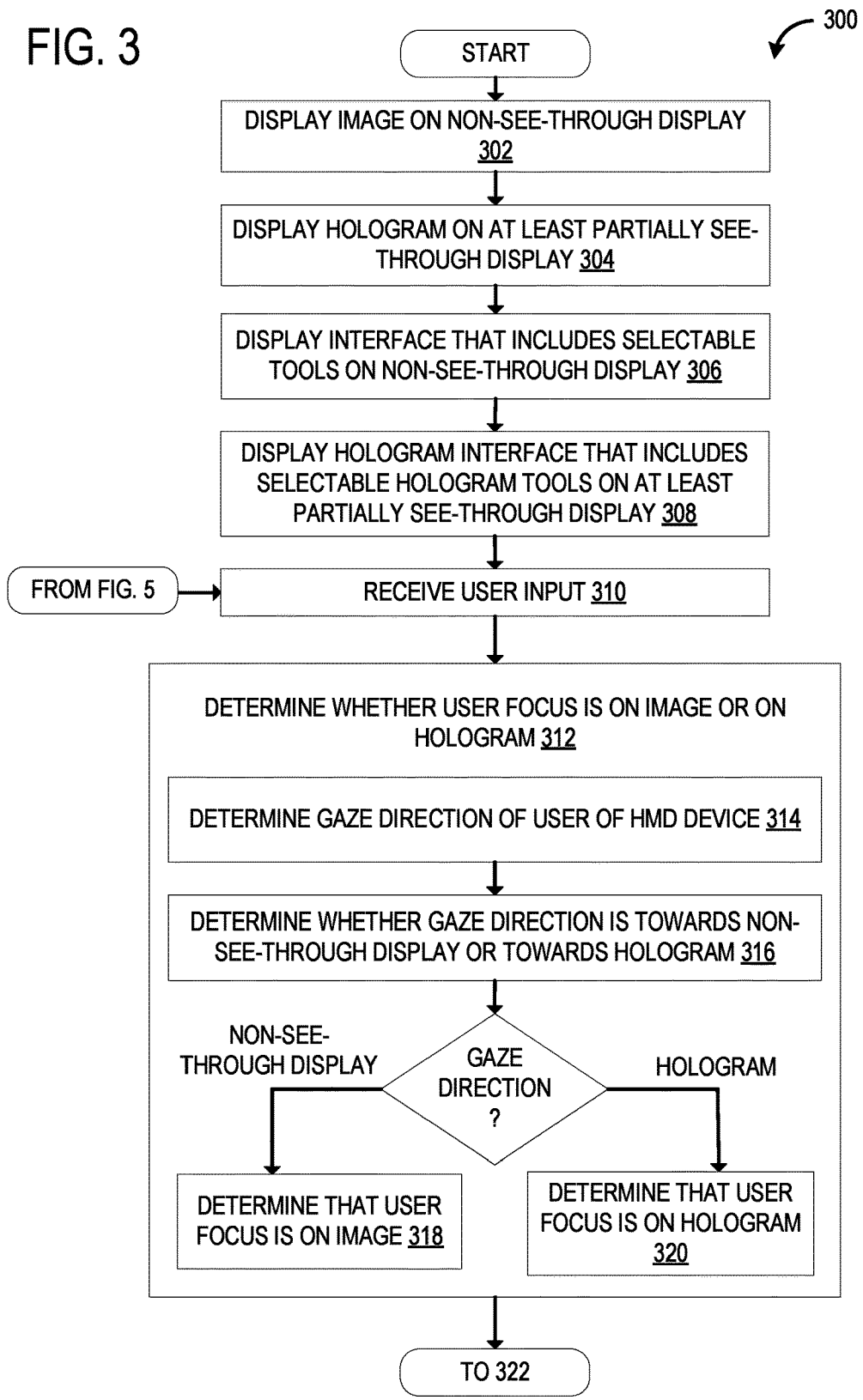
FIG. 3 shows a flowchart for a method for mapping input from a user input device according to an embodiment of the present description.

FIG. 3 illustrates an example method 300 for mapping input to hologram or two-dimensional display. At step 302, the method 300 includes displaying an image on a non-see-through display, the non-see-through display being arranged in a three dimensional environment.

Proceeding from step 302 to step 304, the method 300 includes displaying, on an at least partially see-through display of a head mounted display device, a hologram at a location in the three dimensional environment. In one embodiment, the image is a two-dimensional visual representation of a data set and the hologram is a three-dimensional holographic representation of the data set. In one specific example, the data set is a three dimensional model, and the two-dimensional image may be a two-dimensional view of the three dimensional model from a viewpoint. In this example, the hologram may be a three-dimensional view of the three dimensional model from the viewpoint of the user of the head mounted display device relative to the location of the hologram in the three dimensional environment.

Advancing from step 304 to step 306, the method 300 includes displaying, on the non-see-through display, an interface that includes selectable tools, each tool being associated with a programmatic function. In one specific example, the interface is a graphical user interface that includes selectable buttons for each selectable tool. It will be appreciated that the selectable tools may be selected through a variety of input methods, such as a mouse click, a voice command, or a touch pad.

Proceeding from step 306 to step 308, the method 300 includes displaying, on the at least partially see-through display, a hologram interface that includes selectable hologram tools, each hologram tool being associated with a hologram programmatic function. In one specific example, the hologram interface is a holographic graphical user interface that is displayed on the at least partially see-through display so as to appear to the user to be located at a position in the three dimensional environment. In one embodiment, the interface includes a first tool having a first programmatic function, and the hologram interface includes a corresponding first hologram tool having a first hologram programmatic function that corresponds to the first programmatic function. In one example, the first programmatic function is a two-dimensional translation function to translate a portion of the three dimensional model of the data set from one position to another position, the two-dimensional translation being along the plane of the non-see-through display. In this example, the first hologram programmatic function that corresponds to the first programmatic function may be a three-dimensional translation function that is a translation along any vector in three dimensional space. It will be appreciated that other programmatic and hologram programmatic functions may be associated with the tools. As a few non-limiting examples, the programmatic function may be a function for resizing, tumbling, rotating, selecting, or deleting.

Advancing from step 308 to step 310, the method 300 includes receiving, via a user input device, a user input. It will be appreciated that the user input device may be a mouse, keyboard, touch screen, or any other suitable input device. Thus, the user input may correspondingly be a mouse movement, and button press, a touch gesture, or any other suitable user input.

Advancing from step 310 to step 312, the method 300 includes determining whether a user focus is on the image or the hologram. In one embodiment, step 310 includes additional substeps 314-320. Proceeding to substep 314, the method 300 includes determining a gaze direction of a user of the head mounted display device. As discussed above, the gaze direction of the user may be determined through sensor data received via the optical sensor system 20 and position sensor system 26 of the head mounted display device 12.

Advancing from substep 314 to substep 316, the method 300 includes determining whether the gaze direction of the user is towards the non-see-through display or towards the location of the hologram in the three dimensional environment. Method 300 may proceed from substep 316 to either substep 318 or substep 320 based on the determination of substep 316.

Based on determining that the gaze direction of the user is towards the non-see-through display, the method 300 advances from substep 316 to substep 318 and includes determining that the user focus is on the image. Based on determining that the gaze direction of the user is towards the location of the hologram, the method 300 advances from substep 316 to substep 320 and includes determining that the user focus is on the hologram.

Figure 4:
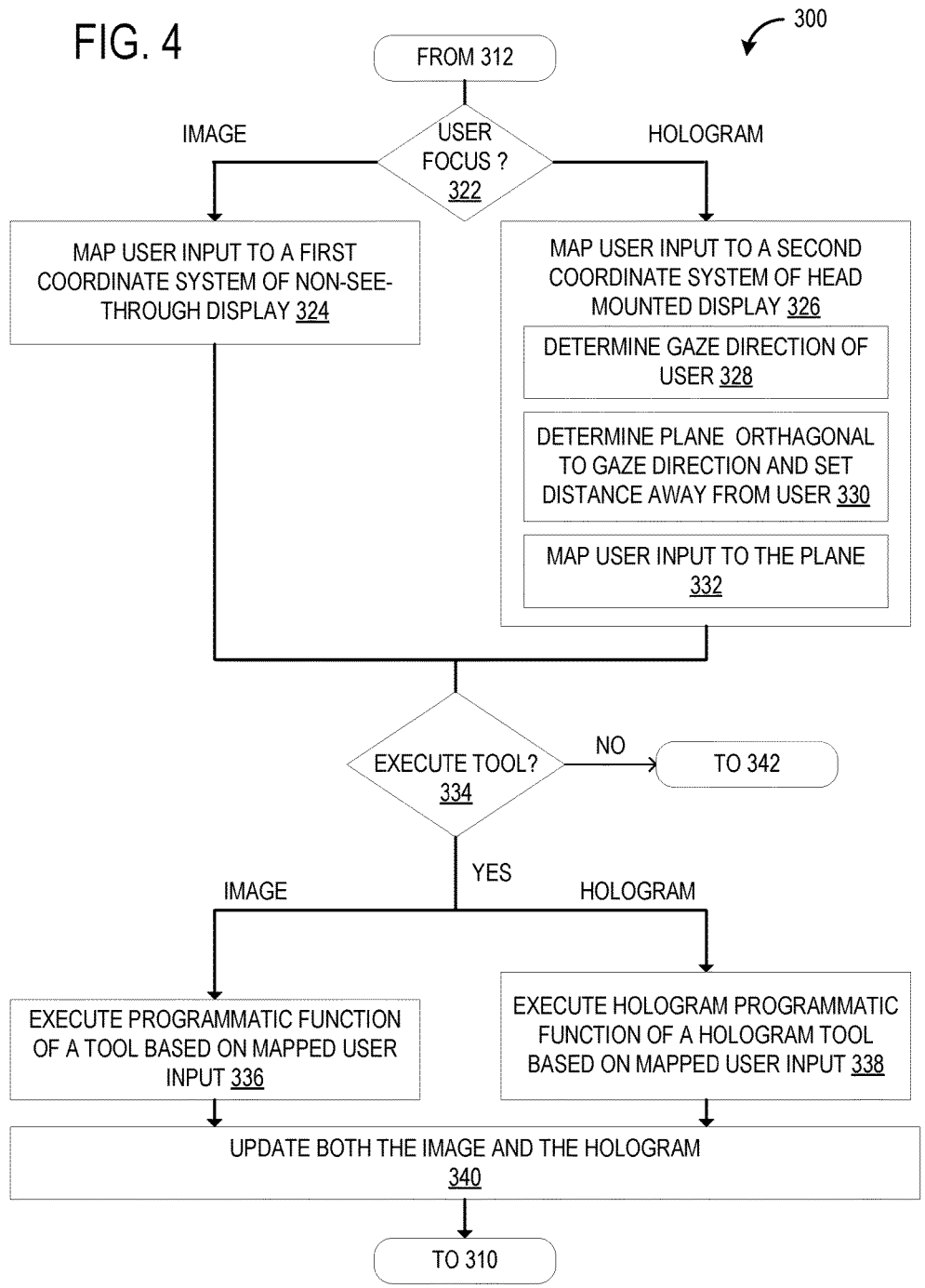
FIG. 4 shows a flowchart that continues the method of FIG. 3.

The method 300 continues in FIG. 4, proceeding from step 312 to step 322. From step 322, the method 300 may advance to either step 324 or step 326 based on the determination of steps 314 and 316. If a determination is made that the user focus is on the image, the method 300 advances to step 324 and includes mapping the user input to a first coordinate space of the non-see-through display. Proceeding from step 324 to step 334, the method 300 includes determining whether a tool of the interface is to be executed based on the mapped user input. In one example, the tool is executed based on a predetermined input, such as clicking and holding left click of a computer mouse. However, it will be appreciated that other predetermined inputs are possible, such as a touch input, a keyboard input, or a voice command as a few non-limiting examples.

If a determination is made that the tool will not be executed, the method 300 proceeds from step 334 to step 342. If a determination is made the tool is to be executed, the method 300 advances from step 334 to step 336, and includes executing the programmatic function of a selected tool on the data set based on the mapped user input. Proceeding from step 336 to step 340, the method 300 includes updating both the image and the hologram based on the programmatic function executed on the data set. Next, the method 300 proceeds from step 340 back to step 310, and includes receiving a next user input and proceeding through a next iteration of method 300.

Turning back to step 322, if a determination is made that the user focus is on the hologram, the method 300 advances to step 326 and includes mapping the user input to a second coordinate space of the head mounted display device. Step 326 of method 300 may include substeps 328 through 332. At substep 328, the method 300 includes determining a gaze direction of a user of the head mounted display device. Advancing from substep 328 to substep 330, the method 300 includes determining a plane that is orthogonal to the gaze direction of the user and is a set distance away from the user. It will be appreciated that the set distance may be a variable distance that may be set based on additional user input, such as input from a scroll wheel of the mouse. In another example, the set distance may be determined by first determining an intersection between the user's gaze direction and the hologram. The set distance may be determined such that the plane is located at the intersection between the user's gaze direction and the hologram. Proceeding from substep 330 to substep 332, the method 300 includes mapping the user input to the plane.

Advancing from step 326 to step 334, the method 300 includes determining whether a hologram tool of the interface is to be executed based on the mapped user input. In one example, the hologram tool is executed based on a predetermined input, such as clicking and holding left click of a computer mouse. However, it will be appreciated that other predetermined inputs are possible, such as a touch input, a keyboard input, or a voice command as a few non-limiting examples.

If a determination is made that the hologram tool will not be executed, the method 300 proceeds from step 334 to step 342. If a determination is made the tool is to be executed, the method 300 advances from step 334 to step 338, and includes executing the hologram programmatic function of a selected hologram tool on the data set based on the mapped user input. Advancing from step 338 to step 340, the method 300 includes updating both the image and the hologram based on the hologram programmatic function executed on the data set.

Figure 5:
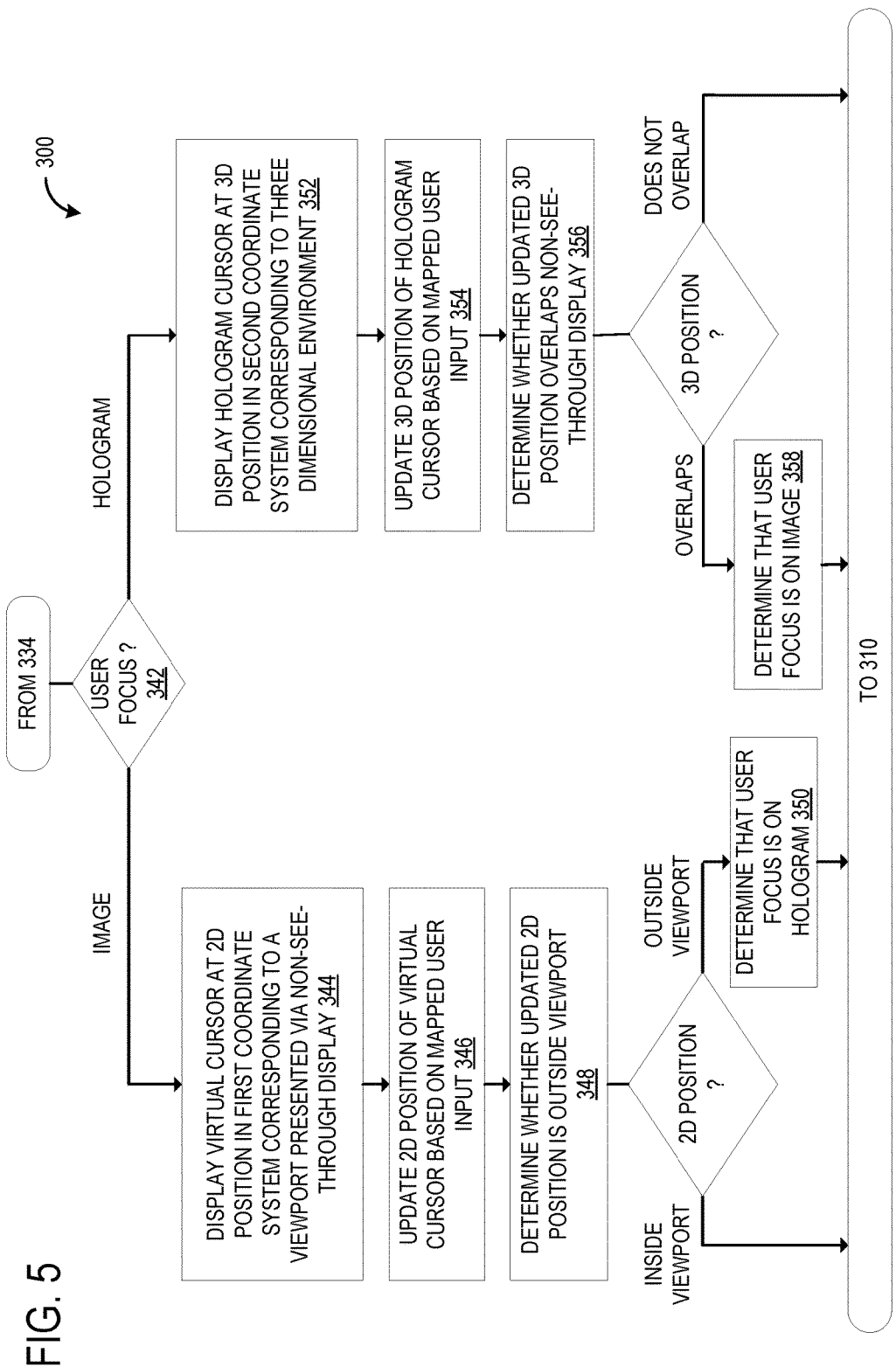
FIG. 5 shows a flowchart that continues the method of FIG. 3.

As discussed above, if a determination is made that the tool or hologram tool will not be executed, the method 300 proceeds from step 334 to step 342 illustrated in FIG. 5. From step 342, the method 300 may proceed to either step 344 or step 352 based on the user focus determination made at step 312. If the determination is made that the user focus is on the image, the method 300 advances to step 344 and includes displaying a virtual cursor at a two dimensional position in the first coordinate space corresponding to a viewport presented via the non-see-through display. It will be appreciated that the virtual cursor may take a variety of suitable forms, such as an arrow, a virtual hand, or a pointer as a few non-limiting examples.

Proceeding from step 344 to step 346, the method 300 includes updating the two dimensional position of the virtual cursor based on the mapped user input. Advancing from step 346 to step 348, the method 300 includes determining whether the updated two dimensional position of the virtual cursor is outside the viewport. If the determination is made that the updated two dimensional position of the virtual cursor is outside the viewport, the method 300 proceeds to step 350 and includes determining that the user focus is on the hologram. Next, the method 300 proceeds from step 350 back to step 310, and includes receiving a next user input and proceeding through a next iteration of method 300. On the other hand, if the determination is made that the updated two dimensional position of the virtual cursor is inside the viewport, the method 300 directly returns to step 310. In one specific example, the virtual cursor may be determined to be outside the viewport if a portion of the virtual cursor lies outside the viewport. In another example, the virtual cursor may be determined to be outside the viewport if the entire virtual cursor lies outside the viewport.

Turning back to step 342, if the determination is made that the user focus is on the hologram, the method 300 advances to step 352 and includes displaying the virtual cursor as a hologram cursor at a three dimensional position in the second coordinate space corresponding to the three dimensional environment. It will be appreciated that the hologram cursor may take a variety of suitable forms, such as a three dimensional arrow, a three dimensional hand, or a three dimensional pointer as a few non-limiting examples.

Proceeding from step 352 to step 354, the method 300 includes updating the three dimensional position of the hologram cursor based on the mapped user input. Advancing from step 354 to step 356, the method 300 includes determining whether the updated three dimensional position of the hologram cursor overlaps the non-see-through display. If the determination is made that the updated three dimensional position of the hologram cursor overlaps the non-see-through display, the method 300 proceeds to step 358 and includes determining that the user focus is on the image. Next, the method 300 proceeds from step 358 back to step 310, and includes receiving a next user input and proceeding through a next iteration of method 300. On the other hand, if the determination is made that the updated three dimensional position of the hologram cursor does not overlap the non-see-through display, the method 300 may directly returns to step 310. In one specific example, the hologram cursor may be determined to overlap the non-see-through display if a portion of the hologram cursor overlaps the non-see-through display. In another example, the hologram cursor may be determined to overlap the non-see-through if the entire hologram cursor overlaps the non-see-through display. In these example, determining whether the hologram cursor overlaps the non-see-through display may be determined from the vantage point of the head mounted display device discussed above.

Figure 6:
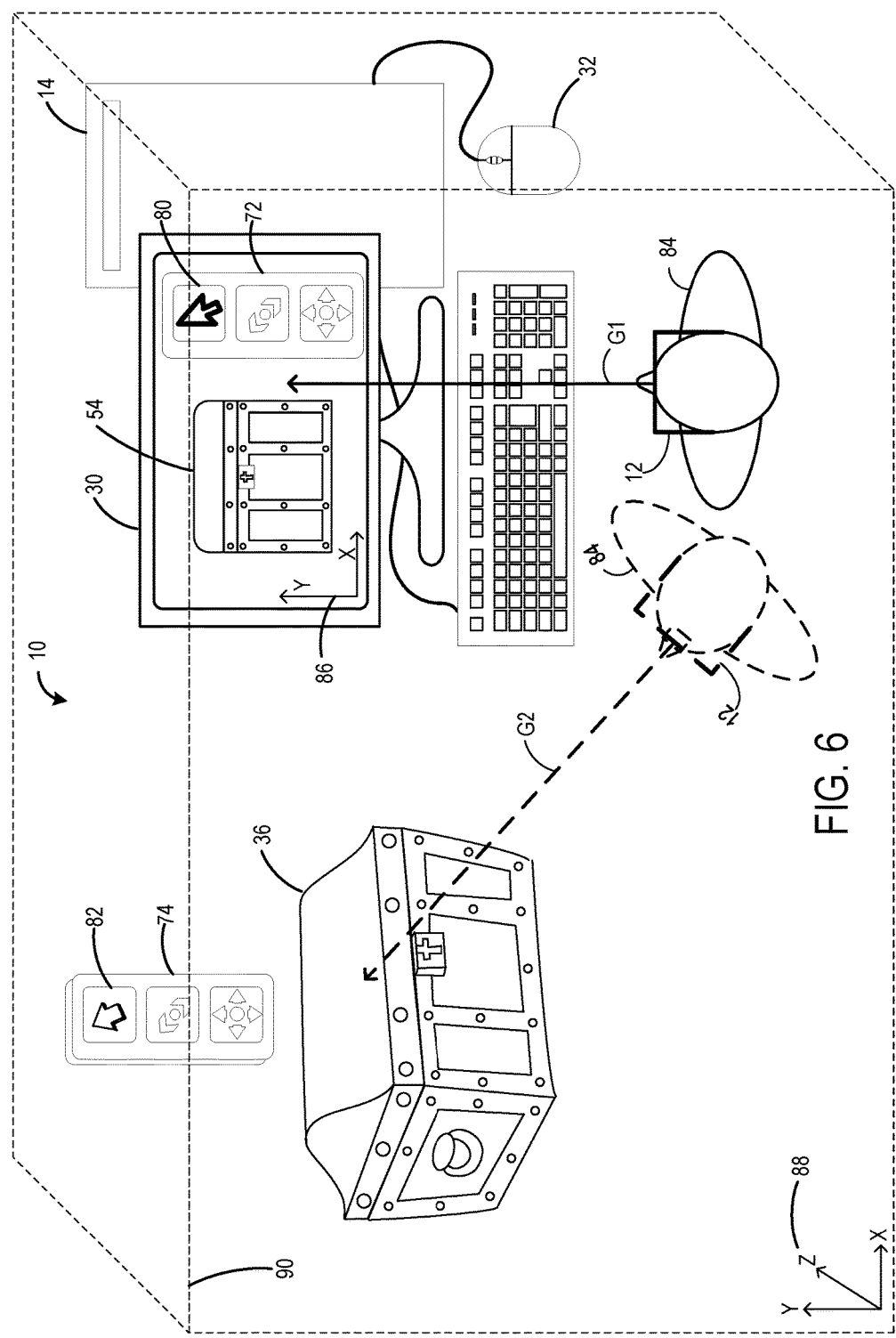
FIG. 6 shows an example image and hologram displayed with the computing system of FIG. 1.

FIG. 6 illustrates an example computing system 10 according to the embodiments and methods discussed above. The example computing system 10 includes computing device 14 configured to display an image 54 and an interface 72 on a non-see-through display 30. The interface 72 may include a plurality of selectable tools having associated programmatic functions. For example, the interface 72 may include a first tool 80 having a first programmatic function. In the illustrated example, the first tool may be a cursor tool for selecting or highlighting portions of the data set. It will be appreciated that although the illustrated example of interface 72 includes three selectable tools, the interface 72 may include any suitable number of selectable tools.

The computing device 14 is further configured to send a hologram 36 and a hologram interface 74 to the head mounted display device for display on the at least partially see-through display 16. The hologram 36 and the hologram interface 74 may be displayed so as to appear at three dimensional positions in a viewing volume 90 defined by the head mounted display device 12. The hologram interface 74 may include a plurality of selectable hologram tools having associated hologram programmatic functions. For example, the hologram interface 74 may include a first hologram tool 82 having a first hologram programmatic function. In the illustrated example, the first tool may be a holographic cursor tool for selecting or highlighting portions of the data set. It will be appreciated that although the illustrated example of hologram interface 74 includes three selectable hologram tools, the hologram interface 74 may include any suitable number of selectable hologram tools.

A user 84 of the computing system 10, may enter user input via the user input device 32, which is a computer mouse in the illustrated example. The computing device 14 maps that user input to either the first coordinate system 86 of the non-see-through display or the second coordinate system 88 of the head mounted display 12. The computing device 14 determine whether a user focus is on the image 54 or the hologram 36 based on a gaze direction G1 or G2 of the user 84 of the head mounted display device 12. In the illustrated example, the gaze direction G1 corresponds to a gaze direction of the user that is towards the non-see-through display device. Thus, if the user is gazing along gaze direction G1, the computing device 14 is configured to determine that the user focus is on the image 54 and maps the user input to the first coordinate system 86 of the non-see-through display device 30.

Further in the illustrated example, the gaze direction G2 corresponds to a gaze direction of the user that is towards the location of the hologram 36 in the viewing volume 90. Thus, if the user is gazing along gaze direction G2, the computing device 14 is configured to determine that the user focus is on the hologram 36 and maps the user input to the second coordinate system 88 of the viewing volume 90.

Figure 7:
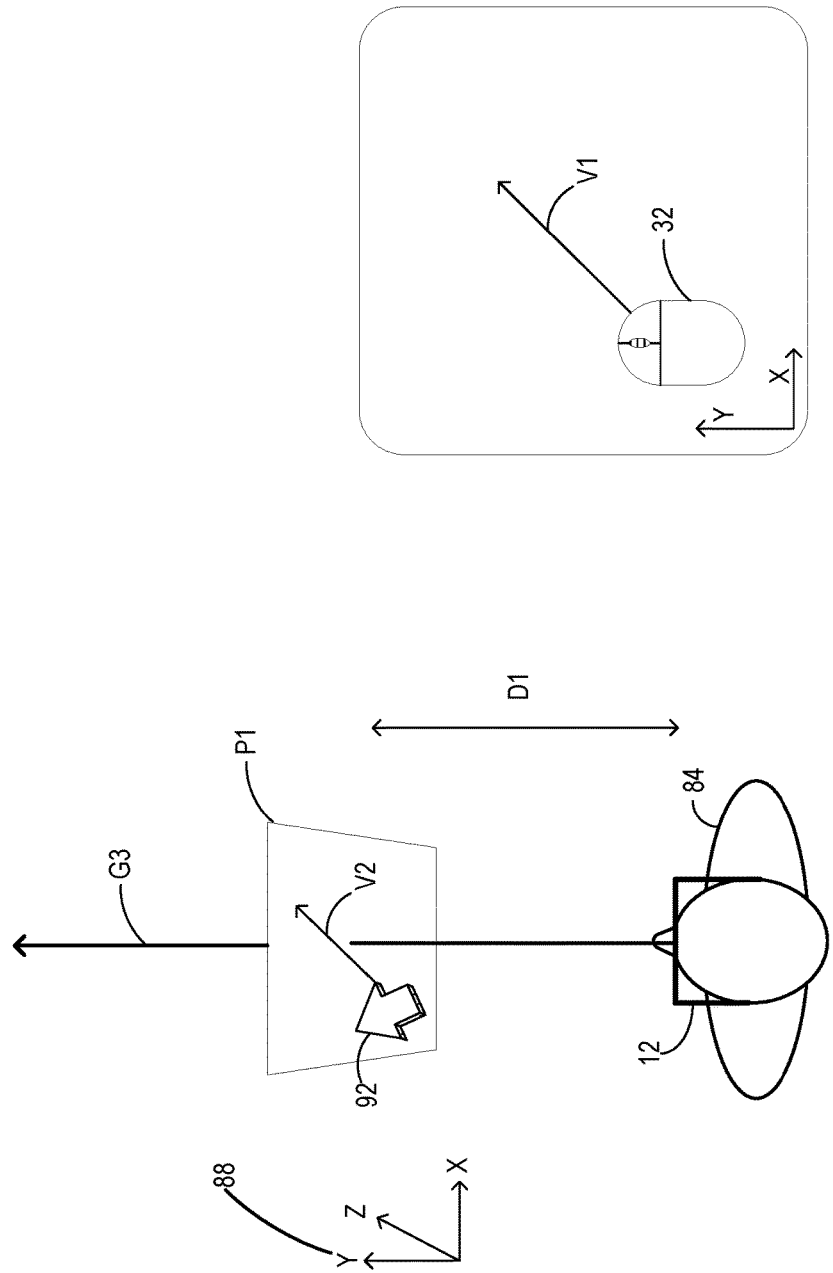
FIG. 7 shows an example of mapping a mouse input to a three dimensional coordinate space with the computing system of FIG. 1.

FIG. 7 illustrates an example of mapping the user input to the second coordinate system of the head mounted display device 12. In the illustrated example, the user input device 32 is a computer mouse configured to output a two dimensional vector V1 corresponding to movement of the computer mouse. To map this two dimensional vector V1 to the second coordinate system 88, the computing device 14 may be configured to determine a gaze direction G3 of the user 84, and a plane P1 orthogonal to the gaze direction G3 and a set distance D1 away from the user 84 of the head mounted display device 12. The computer device 14 is further configured to map the user input, which is the two dimensional vector input V1 in the illustrated example, to the plane P1. Thus, the user input may be mapped to the second coordinate system to generate a mapped user input, which is the three dimensional vector V2. In the illustrated example, a holographic cursor 92 is three dimensional translated in the second coordinate system 88 based on the three dimensional vector V2.

Figure 8:
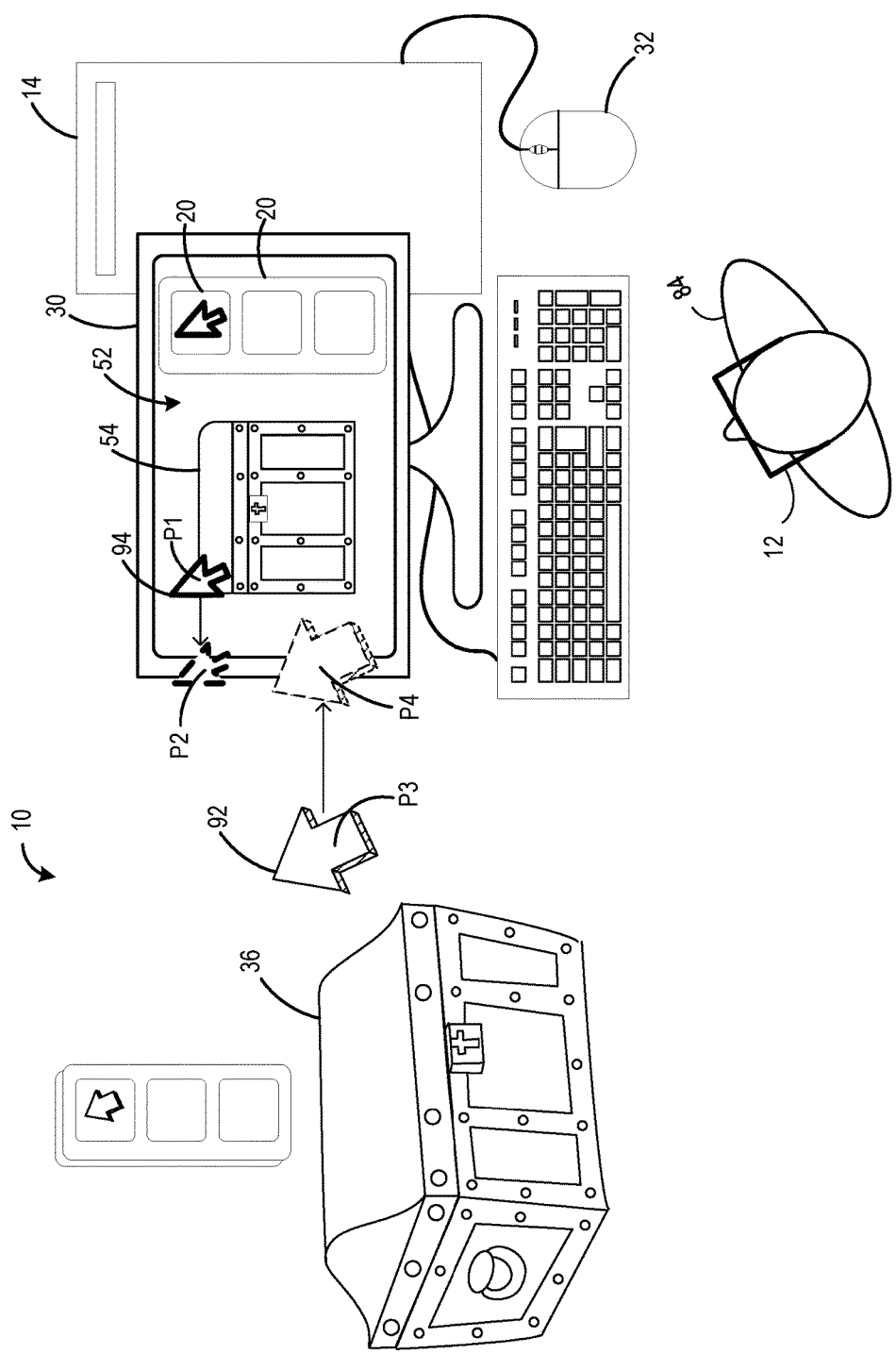
FIG. 8 shows an example virtual cursor and hologram cursor displayed with the computing system of FIG. 1.

FIG. 8 illustrates an example of the method of FIG. 5. In the illustrated example, if a user focus is on the image 54, then the computing device 14 is configured to display a virtual cursor 94 at a two dimensional position P1 in the first coordinate space corresponding to a viewport 52 presented via the non-see-through display 30. Next, after mapping a user input received via user input device 32, the computing device 14 is configured to update the two dimensional position P1 of the virtual cursor 94 based on the mapped user input. In the illustrated example, the two dimensional position of the virtual cursor 94 is updated from two dimensional position P1 to updated two dimensional P2. The computing device 14 is then configured to determine whether the updated two dimensional position of the virtual cursor 94 is outside the viewport 52. As illustrated, the updated two dimensional position P2 of the virtual cursor 94 is outside the viewport 52. Thus, the computer device 14 is configured to determine that the user focus is on the hologram 36.

On the other hand, if the user focus is the on the hologram 36, then the computing device 14 is configured to display the virtual cursor as a hologram cursor 92 at a three dimensional position P3 in the second coordinate space corresponding to the three dimensional environment. Next, after mapping the user input received via the user input device 32, the computing device 14 is configured to update the three dimensional position P3 of the hologram cursor 92 based on the mapped user input. In the illustrated example, the three dimensional position of the hologram cursor 92 is updated from three dimensional position P3 to updated three dimensional position P4. The computing device 14 is then configured to determine whether the updated three dimensional position P4 of the hologram cursor 92 overlaps the non-see-through display 30 arranged in the three dimensional environment. As illustrated, the updated three dimensional position P4 of the hologram cursor 92 overlaps with the non-see-through display 30 from the perspective of the user 84. Thus, the computing device 14 is configured to determine that the user focus is on the image 54. It will be appreciated that the method of FIG. 5 illustrated in FIG. 8 may be a continual process, changing the user focus back and forth from the image 54 and the hologram 36 as the user inputs a stream of user inputs to the user input device 32.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
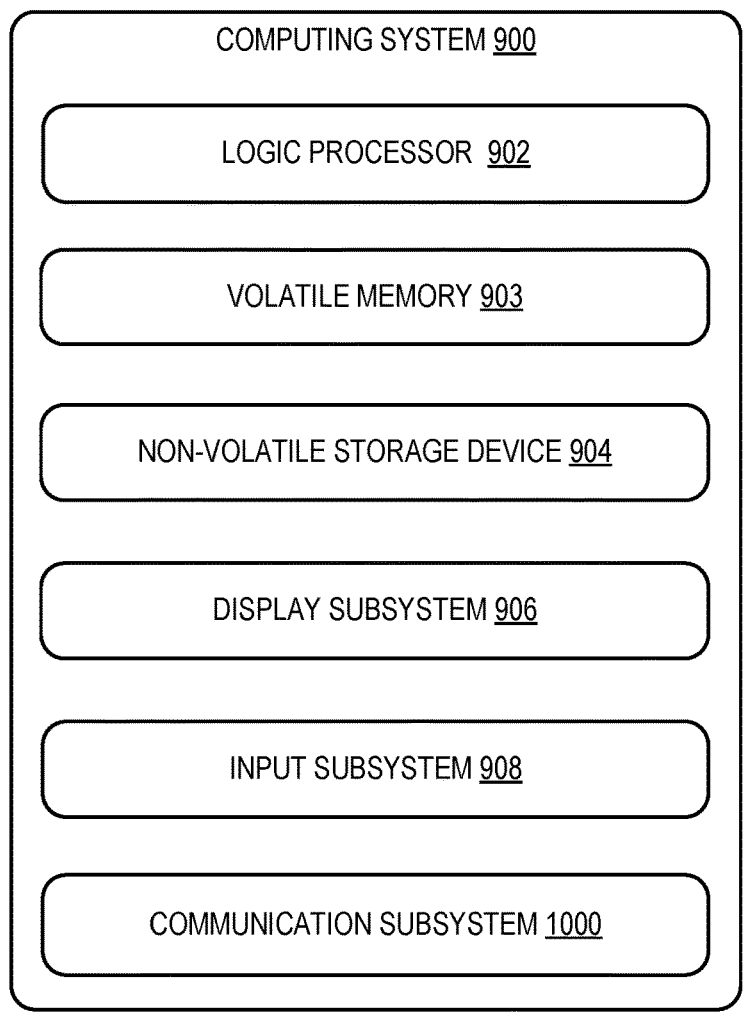
FIG. 9 shows internal hardware components of an example computing device that may serve as the computing device and/or head mounted display device of the computing system of FIG. 1.

FIG. 9 schematically shows a non-limiting embodiment of a computing system 900 that can enact one or more of the methods and processes described above. Computing system 900 is shown in simplified form. Computing system 900 may take the form of one or more head-mounted display devices and one or more devices cooperating with a head-mounted display device as shown in FIG. 1, (e.g., personal computers, server computers, tablet computers, home-entertainment computers, network computing devices, gaming devices, mobile computing devices, mobile communication devices (e.g., smart phone), and/or other computing devices).

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The on-board computing system 28 of FIG. 2, it will be appreciated, includes a processor and associated non-volatile and volatile memory for executing software (or firmware) applications. The processor for the HMD device 12 may be a central processing unit (CPU) with off-chip volatile and non-volatile memory, a system-on-chip with on-board volatile memory and off-board non-volatile memory, an application specific integrated circuit (ASIC), etc.

The terms "module," "program," and "engine" may be used to describe an aspect of computing system 900 implemented to perform a particular function. In some cases, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. Display subsystem 906 may include both the non-see-through display 30 and the at least partially see through display 16. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. Input subsystem may include user input device 32, optical sensor system 30, and position sensor system 26. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to position sensor system 26 of FIG. 1; and/or any other suitable sensor.

When included, communication subsystem 1000 may be configured to communicatively couple the computing device 14 with the head mounted display device 12. Communication subsystem 1000 may additionally be configured to communicatively couple the computing system 10 with one or more other computing devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a computing system comprising a computing device configured to communicatively couple to a head mounted display device having an at least partially see-through display configured to display holograms to a user in a three dimensional environment, the computing device including a non-see-through display arranged in the three dimensional environment, a user input device, and a processor configured to: display an image on the non-see-through display, send to the head mounted display device, for display on the at least partially see-through display, a hologram at a location in the three dimensional environment, receive, via the user input device, a user input, determine whether a user focus is on the image or the hologram, if a determination is made that the user focus is on the image, map the user input to a first coordinate space of the non-see-through display, and if a determination is made that the user focus is the on the hologram, map the user input to a second coordinate space of the head mounted display device. The computing system may additionally or alternatively include, wherein the image is a two-dimensional visual representation of a data set and the hologram is a three dimensional holographic representation of the data set. The computing system may additionally or alternatively include, wherein the processor is further configured to display, on the non-see-through display, an interface that includes selectable tools, each tool being associated with a programmatic function, and send to the head mounted display device, for display on the at least partially see-through display, a hologram interface that includes selectable hologram tools, each hologram tool being associated with a hologram programmatic function. The computing system may additionally or alternatively include, wherein the interface includes a first tool having a first programmatic function, and the hologram interface includes a corresponding first hologram tool having a first hologram programmatic function that corresponds to the first programmatic function. The computing system may additionally or alternatively include, wherein the processor is further configured to: if the determination is made that the user focus is on the image: execute the programmatic function of a selected tool on the data set based on the mapped user input, and update both the image and the hologram based on the programmatic function executed on the data set, if the determination is made that the user focus is the on the hologram: execute the hologram programmatic function of a selected hologram tool on the data set based on the mapped user input, and update both the image and the hologram based on the hologram programmatic function executed on the data set. The computing system may additionally or alternatively include, wherein to determine whether the user focus is on the image or on the hologram, the processor is configured to: determine a gaze direction of the user, determine whether the gaze direction of the user is towards the non-see-through display or towards the location of the hologram in the three dimensional environment, based on the determination that the gaze direction of the user is towards the non-see-through display, determine that the user focus is on the image, and based on the determination that the gaze direction of the user is towards the location of the hologram, determine that the user focus is on the hologram. The computing system may additionally or alternatively include, wherein if the determination is made that the user focus is on the image, the processor is further configured to: display a virtual cursor at a two dimensional position in the first coordinate space corresponding to a viewport presented via the non-see-through display, update the two dimensional position of the virtual cursor based on the mapped user input, determine whether the updated two dimensional position of the virtual cursor is outside the viewport, and if the determination is made that the updated dimensional position of the virtual cursor is outside the viewport, determine that the user focus is on the hologram. The computing system may additionally or alternatively include, wherein if the determination is made that the user focus is the on the hologram, the processor is further configured to: send to the head mounted display device, for display on the at least partially see-through display, the virtual cursor as a hologram cursor at a three dimensional position in the second coordinate space corresponding to the three dimensional environment, update the three dimensional position of the hologram cursor based on the mapped user input, determine whether the updated three dimensional position of the hologram cursor overlaps the non-see-through display arranged in the three dimensional environment, and if the determination is made that the updated three dimensional position of the hologram cursor overlaps the non-see-through display, determine that the user focus is on the image. The computing system may additionally or alternatively include, wherein to map the user input to the second coordinate space, the processor is configured to: determine a gaze direction of the user, determine a plane that is orthogonal to the gaze direction of the user and is a set distance away from the user, and map the user input to the plane.

Another aspect provides a method comprising: displaying an image on a non-see-through display, the non-see-through display being arranged in a three dimensional environment, displaying, on an at least partially see-through display of a head mounted display device, a hologram at a location in the three dimensional environment, receiving, via a user input device, a user input, determining whether a user focus is on the image or the hologram, if a determination is made that the user focus is on the image, mapping the user input to a first coordinate space of the non-see-through display, and if a determination is made that the user focus is the on the hologram, mapping the user input to a second coordinate space of the head mounted display device. The method may additionally or alternatively include, wherein the image is a two-dimensional visual representation of a data set and the hologram is a three dimensional holographic representation of the data set. The method may additionally or alternatively include, displaying, on the non-see-through display, an interface that includes selectable tools, each tool being associated with a programmatic function, and displaying, on the at least partially see-through display, a hologram interface that includes selectable hologram tools, each hologram tool being associated with a hologram programmatic function. The method may additionally or alternatively include, wherein the interface includes a first tool having a first programmatic function, and the hologram interface includes a corresponding first hologram tool having a first hologram programmatic function that corresponds to the first programmatic function. The method may additionally or alternatively include, if the determination is made that the user focus is on the image: executing the programmatic function of a selected tool on the data set based on the mapped user input, and updating both the image and the hologram based on the programmatic function executed on the data set, if the determination is made that the user focus is the on the hologram: executing the hologram programmatic function of a selected hologram tool on the data set based on the mapped user input, and updating both the image and the hologram based on the hologram programmatic function executed on the data set. The method may additionally or alternatively include, wherein determining whether the user focus is on the image or on the hologram, further comprises: determining a gaze direction of a user of the head mounted display device, whether the gaze direction of the user is towards the non-see-through display or towards the location of the hologram in the three dimensional environment, based on determining that the gaze direction of the user is towards the non-see-through display, determining that the user focus is on the image, and based on determining that the gaze direction of the user is towards the location of the hologram, determining that the user focus is on the hologram. The method may additionally or alternatively include, wherein if the determination is made that the user focus is on the image, the method further comprises: displaying a virtual cursor at a two dimensional position in the first coordinate space corresponding to a viewport presented via the non-see-through display, updating the two dimensional position of the virtual cursor based on the mapped user input, determining whether the updated two dimensional position of the virtual cursor is outside the viewport, and if the determination is made that the updated dimensional position of the virtual cursor is outside the viewport, determining that the user focus is on the hologram. The method may additionally or alternatively include, wherein if the determination is made that the user focus is the on the hologram, the method further comprises: displaying the virtual cursor as a hologram cursor at a three dimensional position in the second coordinate space corresponding to the three dimensional environment, updating the three dimensional position of the hologram cursor based on the mapped user input, determining whether the updated three dimensional position of the hologram cursor overlaps the non-see-through display arranged in the three dimensional environment, and if the determination is made that the updated three dimensional position of the hologram cursor overlaps the non-see-through display, determining that the user focus is on the image. The method may additionally or alternatively include, wherein mapping the user input to the second coordinate space, further comprises: determining a gaze direction of a user of the head mounted display device, determining a plane that is orthogonal to the gaze direction of the user and is a set distance away from the user, and mapping the user input to the plane.

Another aspect provides a computing device comprising: a non-see-through display arranged in a three dimensional environment, a user input device, and a processor configured to: display an image on the non-see-through display, the image being a two-dimensional visual representation of a data set, send, to a head mounted display device, the data set to be presented via a hologram displayed on the head mounted display device at a location in the three dimensional environment, receive, via the user input device, a user input, determine whether a user focus is on the image or the hologram, if a determination is made that the user focus is on the image, map the user input to a first coordinate space of the non-see-through display, and if a determination is made that the user focus is on the hologram, map the user input to a second coordinate space of the head mounted display device. The computing device may additionally or alternatively include, wherein to map the user input to the second coordinate space, the processor is further configured to: determine a gaze direction of a user of the head mounted display device, determine a plane that is orthogonal to the gaze direction of the user and is a set distance away from the user, and map the user input to the plane.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system comprising:
a computing device configured to communicatively couple to a head mounted display device having a display configured to display three-dimensional objects to a user in a three-dimensional environment, the computing device including:
a computer display device arranged in the three-dimensional environment;
a user input device; and
a processor configured to:
display an image on the computer display device;
send to the head mounted display device, for display on the display, a three-dimensional object at a location in the three-dimensional environment;
receive, via the user input device, a user input;
determine whether a user focus is on the image or the three-dimensional object;
if a determination is made that the user focus is on the image, map the user input to a first coordinate space of the computer display device; and
if a determination is made that the user focus is the on the three-dimensional object, map the user input to a second coordinate space of the head mounted display device.

2. The computing system of claim 1, wherein the head mounted display device further includes one or more outward facing cameras.

3. The computing system of claim 2, wherein the head mounted display device is configured to receive optical sensor information of the three-dimensional environment via the one or more outward facing cameras.

4. The computing system of claim 3, wherein the processor is further configured to generate a virtual model of the three-dimensional environment based on the optical sensor information.

5. The computing system of claim 1, wherein
the three-dimensional object is a hologram displayed on the display so that it appears to overlap the three-dimensional environment.

6. The computing system of claim 5, wherein the image is a two-dimensional visual representation of a data set and the hologram is a three-dimensional holographic representation of the data set.

7. The computing system of claim 6, wherein the processor is further configured to:
display, on the computer display device, an interface that includes selectable tools, each tool being associated with a programmatic function; and
send to the head mounted display device, for display on the display, a hologram interface that includes selectable hologram tools, each hologram tool being associated with a hologram programmatic function.

8. The computing system of claim 7, wherein the interface includes a first tool having a first programmatic function, and the hologram interface includes a corresponding first hologram tool having a first hologram programmatic function that corresponds to the first programmatic function.

9. The computing system of claim 7, wherein the processor is further configured to:
if the determination is made that the user focus is on the image:
execute the programmatic function of a selected tool on the data set based on the mapped user input; and
update both the image and the three-dimensional object based on the programmatic function executed on the data set;
if the determination is made that the user focus is the on the three-dimensional object:
execute the hologram programmatic function of a selected hologram tool on the data set based on the mapped user input; and
update both the image and the three-dimensional object based on the hologram programmatic function executed on the data set.

10. The computing system of claim 1, wherein to determine whether the user focus is on the image or on the three-dimensional object, the processor is configured to:
determine a gaze direction of the user;
determine whether the gaze direction of the user is towards the computer display device or towards the location of the three-dimensional object in the three-dimensional environment;
based on the determination that the gaze direction of the user is towards the computer display device, determine that the user focus is on the image; and
based on the determination that the gaze direction of the user is towards the location of the three-dimensional object, determine that the user focus is on the three-dimensional object.

11. The computing system of claim 1, wherein if the determination is made that the user focus is on the image, the processor is further configured to:
display a virtual cursor at a two dimensional position in the first coordinate space corresponding to a viewport presented via the computer display device;
update the two dimensional position of the virtual cursor based on the mapped user input;
determine whether the updated two dimensional position of the virtual cursor is outside the viewport; and
if the determination is made that the updated dimensional position of the virtual cursor is outside the viewport, determine that the user focus is on the three-dimensional object.

12. The computing system of claim 11, wherein if the determination is made that the user focus is the on the three-dimensional object, the processor is further configured to:
send to the head mounted display device, for display on the display, the virtual cursor as a three-dimensional cursor at a three-dimensional position in the second coordinate space corresponding to the three-dimensional environment;
update the three-dimensional position of the three-dimensional cursor based on the mapped user input;
determine whether the updated three-dimensional position of the three-dimensional cursor overlaps the computer display device arranged in the three-dimensional environment; and
if the determination is made that the updated three-dimensional position of the three-dimensional cursor overlaps the computer display device, determine that the user focus is on the image.

13. The computing system of claim 1, wherein to map the user input to the second coordinate space, the processor is configured to:
determine a gaze direction of the user;
determine a plane that is orthogonal to the gaze direction of the user and is a set distance away from the user; and
map the user input to the plane.

14. A method comprising:
 displaying an image on a computer display device, the computer display device being arranged in a three-dimensional environment;
 displaying, on a display of a head mounted display device, a three-dimensional object at a location in the three-dimensional environment;
 receiving, via a user input device, a user input;
 determining whether a user focus is on the image or the three-dimensional object;
 if a determination is made that the user focus is on the image, mapping the user input to a first coordinate space of the computer display device; and
 if a determination is made that the user focus is on the three-dimensional object, mapping the user input to a second coordinate space of the head mounted display device.

15. The method of claim 14, wherein the head mounted display device further includes one or more outward facing cameras.

16. The method of claim 15, further comprising receiving optical sensor information of the three-dimensional environment via the one or more outward facing cameras.

17. The method of claim 16, further comprising generating a virtual model of the three-dimensional environment based on the optical sensor information.

18. The method of claim 14, wherein
 the three-dimensional object is a hologram displayed on the display so that it appears to overlap the three-dimensional environment.

19. The method of claim 18, wherein the image is a two-dimensional visual representation of a data set and the hologram is a three-dimensional holographic representation of the data set.

20. A computing device comprising:
 a computer display device arranged in a three-dimensional environment;
 a user input device; and
 a processor configured to:
  display an image on the computer display device, the image being a two-dimensional visual representation of a data set;
  send, to a head mounted display device, the data set to be presented via a three-dimensional object displayed on the head mounted display device at a location in the three-dimensional environment;
  receive, via the user input device, a user input;
  determine whether a user focus is on the image or the three-dimensional object;
  if a determination is made that the user focus is on the image, map the user input to a first coordinate space of the computer display device; and
  if a determination is made that the user focus is on the three-dimensional object, map the user input to a second coordinate space of the head mounted display device.

* * * * *